UNITED STATES PATENT OFFICE.

JOKICHI TAKAMINE, OF CHICAGO, ILLINOIS.

PROCESS OF UTILIZING WASTE PORTIONS OF PRINTERS' INK-ROLLERS.

SPECIFICATION forming part of Letters Patent No. 635,821, dated October 31, 1899.

Application filed May 23, 1896. Serial No. 592,855. (No specimens.)

*To all whom it may concern:*

Be it known that I, JOKICHI TAKAMINE, a subject of the Emperor of Japan, residing at Chicago, in the county of Cook and State of Illinois, have invented a new and useful Method of Recovering and Utilizing the Waste Portions of Printers'-Ink-Roller Coverings and Similar Material, of which the following is a specification.

This invention relates to a method of recovering and utilizing the waste portions of printers' rollers and similar material.

Printers' rollers and other articles as usually manufactured are made principally from a composition of glue and glycerin. The glycerin component of the compound, for the sake of cheapness, is frequently replaced by a mixture of glycerin and syrup or glucose and other material. A composition formed from these substances is soft, elastic, and pliable, resembling rubber by touch and in some of its characteristics, and is peculiarly adapted and extensively used for the coverings for the ink and similar rollers of printing-presses and for many other purposes. When this covering becomes worn or otherwise unfit for use, it is removed and replaced by a new covering, the old or worn-out or useless covering, which does not remelt, being thrown away. It is the purpose of the present invention to recover and utilize the component constituents of this waste material.

In the accomplishment of the desired object I first cut or comminute the waste portions referred to into fine particles in any suitable manner and then steep the comminuted or divided mass in a sufficient quantity of water, preferably cold water, to cover the entire mass from a period varying from three to twelve hours or longer. The waste portion of the rollers may be steeped in water from twelve to twenty-four hours and then cut smaller or comminuted, the object being to make the cutting operation much easier. After steeping the mass, as above described, the liquid is drawn off and the mass again steeped with a fresh supply of water in the same manner, while a fresh quantity of the mass is steeped in the liquid first drawn off, thus the liquid last drawn off forming the first bath for the next succeeding batch or mass of the material to be treated. In this manner the soluble matter contained in the comminuted mass and consisting of glycerin, syrup, glucose, borax, and other soluble components of the roller material is separated out by diffusion and passes into solution with the water, while at the same time the residue, consisting mainly of glue, but possibly containing other insoluble substances, swells up and remains in the insoluble condition.

The strength of the liquid in the soluble matter extracted can be concentrated by repeatedly treating fresh quantities of the mass until the solution contains from fifteen to thirty per cent. of soluble matter.

The liquid containing or holding in solution the soluble matter, as described, after clarification or filtration, is then evaporated in a vacuum-pan or in any other suitable or well-known manner and to any suitable or desirable consistency, the resulting product being a mixture of glycerin, syrup, glucose, and other soluble constituents of the original material and possibly some quantity of the glue. This mixture may be utilized in the manufacture of fresh roller material by admixture, if desired, with fresh quantities of glue, glycerin, syrup, glucose, and the like.

The remaining portion or insoluble glue is lightly pressed in canvas or in any other suitable or convenient way to express therefrom as large a portion as possible or desirable of the water or liquid absorbed thereby, and to the pressed mass is added nitric, hydrochloric, or acetic acid in the proportion of from five to twenty per cent., by weight. This mass is then gradually warmed or heated up to about 180° Fahrenheit, when the insoluble particles or portions of glue will dissolve and the lumps disappear into a thin solution. The liquid is kept heated a sufficient length of time to permit any oil, varnish, or the like contained in the original mass to rise to the top in the form of a scum, which is suitably skimmed off or otherwise suitably removed. The liquid is then cooled and, if desired, is finally evaporated in any suitable manner and at as low a temperature as possible to the form of a thick sticky liquid. This liquid forms an excellent liquid glue and may be sold for use in place of the ordinary liquid glue of commerce for pasting, gluing, joining, and the like.

Instead of treating the glue part of the mass with acids this part may be melted by subjecting the same to high pressure or superheated steam, or, if desired, a small quantity of the acid may also be used in conjunction with the steam.

From the foregoing description it will be seen that all the components of the original material, which contained about thirty per cent. of glue and about seventy per cent. of glycerin, glucose, syrup, and the like and which heretofore have been thrown away and wasted, are recovered and utilized, and that, too, in a most economical and efficient manner.

It is desirable to further reduce the liquid first obtained in the treatment as above described—that is, the liquid obtained by steeping the mass of comminuted material in water—in order to recover and utilize in their pure state any valuable components thereof. In order to carry out this idea, I first treat such liquid with a suitable ferment, such as yeast or taka-moto, and preferably the latter, on account of its strong fermenting power, in order to ferment the sugars contained in such liquid and convert the same into alcohol, which may be readily separated and recovered by distillation at ordinary steam temperature. The remaining liquor, which consists mainly of glycerin, may then be evaporated preferably in a vacuum-pan at a low temperature to proper consistency and finally distilled with superheated steam. The resulting product will be the commercially-pure glycerin originally employed, which may be used over again or sold for use for other purposes for which glycerin is adapted. Any mineral matter, such as borax, employed in the original material will during this operation crystallize out and may be recovered in the pure state by subjecting to recrystallization for further use.

From the foregoing description it will be seen that I recover all the valuable constituents of the material treated, either in their original or pure state or else in a state in which they may be used and sold as merchantable commodities. It will also be seen that I recover or convert into utilizable and commercial form all the valuable constituents of a material which has heretofore been wasted and thrown away.

I do not desire to be limited or restricted to the exact details of operation set forth, as many variations therefrom would suggest themselves to persons skilled in the art and still fall within the spirit and scope of my invention; but, Having set forth the object and nature of my invention and a method of carrying the same into practical effect, what I claim as new and useful, and desire to secure by Letters Patent of the United States, is—

1. An improved process for the utilization of the described or analogous wastes, which consists in obtaining a solution of the several soluble constituents with the glue precipitated or undissolved (or partially so) therein; then in separating from the solution the insoluble glue, and finally in separating from the soluble and from each other the materials dissolved therein and recovering one or more of such soluble materials; substantially as set forth.

2. An improved process for the utilization of the described or analogous wastes, which consists in obtaining a solution of the several soluble constituents with the glue precipitated or undissolved (or partially so) therein; then in separating the solution from the insoluble glue; then in separating from the solution and from each other the materials dissolved therein and recovering one or more of such soluble materials; and finally in drying the glue; substantially as set forth.

3. An improved process of treating wastes, substantially as described, comprising glue and materials soluble in water, which consists in treating the wastes with water to dissolve the several soluble materials; then in separating from the soluble the insoluble glue; and finally in separating from the solution and from each other the materials dissolved therein and recovering one or more of such soluble materials; substantially as set forth.

4. The improved process of treating wastes, substantially as described, comprising glue, glycerin and a saccharinous material, which consists in treating the wastes with water to dissolve the glycerin and saccharinous material; in separating the solution from the glue, and in fermenting and distilling the solution, whereby the saccharinous material will be converted into a product of fermentation and the glycerin will be recovered; substantially as set forth.

5. The improved process of treating wastes, substantially as described, comprising glue, glycerin and a saccharinous material, which consists in treating the wastes with water to dissolve the glycerin and saccharinous materials, in separating the solution from the glue, in fermenting the solution to convert the saccharinous material into a product of fermentation, in distilling off such product of fermentation, and in finally recovering the glycerin from the residuum of such distillation; substantially as set forth.

6. The improved process of treating wastes, substantially as described, comprising glue, glycerin and a saccharinous material, which consists in treating the wastes with water to dissolve the glycerin and saccharinous material, in separating the solution from the glue, in fermenting the solution to convert the saccharinous material into a product of fermentation, in distilling off such product of fermentation, in evaporating the residuum of such distillation, and in distilling the evaporated solution for the recovery of the glycerin; substantially as set forth.

7. The method of recovering and utilizing the waste portions of printers'-ink-roller coverings and similar material which consists in steeping the material in water to dissolve out the soluble portions thereof, then fermenting the resulting fluid, as and for the purpose set forth.

8. The method of recovering and utilizing the waste portions of printers'-ink-roller coverings and similar material which consists in removing the soluble constituents thereof, then fermenting the removed portions and finally distilling the same, as and for the purpose set forth.

9. The method of recovering and utilizing the waste portions of printers'-ink-roller coverings and similar material which consists in removing the soluble constituents thereof, then treating the removed portion with takamoto and finally distilling the same, as and for the purpose set forth.

10. The method of recovering and utilizing the waste portions of printers'-ink-roller coverings and similar material which consists in removing the soluble constituents thereof, then treating such removed portion to recover therefrom in the form of alcohol the sugar constituents thereof, and finally evaporating and distilling the remaining liquor, as and for the purpose set forth.

In witness whereof I have hereunto set my hand, this 16th day of May, 1896, in the presence of two subscribing witnesses.

JOKICHI TAKAMINE.

Witnesses:
S. E. DARBY,
FRANK T. BROWN.